(12) United States Patent
Tsukamoto

(10) Patent No.: US 7,419,205 B2
(45) Date of Patent: Sep. 2, 2008

(54) CONNECTOR CONNECTING STRUCTURE FOR DETACHABLE SEAT

(75) Inventor: Masashi Tsukamoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 87 days.

(21) Appl. No.: 11/635,483

(22) Filed: Dec. 8, 2006

(65) Prior Publication Data

US 2007/0132265 A1   Jun. 14, 2007

(30) Foreign Application Priority Data

Dec. 8, 2005   (JP)  .............................. 2005-354369

(51) Int. Cl.
*B60N 2/04*   (2006.01)
(52) U.S. Cl. .................. 296/65.03; 248/503.1; 297/336
(58) Field of Classification Search .............. 296/65.03, 296/65.05, 65.13; 297/331, 336; 248/503.1, 248/429; 439/34
See application file for complete search history.

(56) References Cited

U.S. PATENT DOCUMENTS 5,685,612 A * 11/1997 MacDonald et al. ..... 297/378.1
6,135,533 A * 10/2000 Mack et al. ............... 296/65.03
6,250,703 B1 * 6/2001 Cisler et al. .............. 296/65.03
7,284,989 B1 * 10/2007 Hanlon et al. .................. 439/34

FOREIGN PATENT DOCUMENTS

JP   2000-126234 A   5/2000

* cited by examiner

*Primary Examiner*—Dennis H. Pedder
*Assistant Examiner*—Melissa A Black
(74) *Attorney, Agent, or Firm*—Sughrue Mion, PLLC

(57) ABSTRACT

A connector connecting structure for a detachable seat is provided which includes a floor-side hook provided rotatably on a floor, an arm coupled and fixed to the floor-side hook, and a floor-side connector provided on the arm, wherein a seat-side hook causes the floor-side hook in a collapsed state to rotate in a direction in which the floor-side hook erects together with the arm, so that a seat-side connector and the floor-side connector are connected to each other, when a seat is attached. The seat is caused to rotate such that the arm is erecting so as to bring both the connectors into connection with each other. The floor-side hook is provided with a semi-ring portion and a straight portion and is supported on the floor at an intermediate portion thereof by a shaft portion, and the arm is coupled and fixed to the floor-side hook via the shaft portion.

6 Claims, 5 Drawing Sheets

CONNECTOR CONNECTING STRUCTURE FOR DETACHABLE SEAT

BACKGROUND OF THE INVENTION

1. Field of the Invention

The present invention relates to a connector connecting structure with which a seat of a vehicle or the like is detachably attached to a floor thereof, while bringing floor-side and seat-side connectors into connection and disconnection with and from each other, respectively.

2. Related Art

FIG. 5 shows a form of a conventional connector connecting structure for a detachable seat (refer to JP-A-2000-126234).

A detachable seat 91 is such as to be detachably assembled to a link unit 92 in a passenger compartment of a motor vehicle, as well as be used as a wheelchair after the seat is detached from the link unit 92. The link unit 92 is caused to swing or rotate vertically by a driving unit, and the detachable seat 91 is detached from the link unit 92 such that wheels thereof are in touch with the ground.

Connectors 94, 95 are provided on a frame 93 of the seat 91 and the link unit 92, respectively, so that both the connectors 94, 95 are fitted and connected together at the same time as the attachment of the seat 91 and are disconnected to interrupt the connection therebetween at the same time as the detachment of the seat 91. The seat 91 and the link unit 92 are positioned relative to each other by virtue of the engagement of a pin 96 with a hole portion 97. A power supply is supplied to the seat 91 by virtue of the connection of both the connectors 94, 95 together, whereas the power supply is interrupted by virtue of the disengagement of both the connectors 94, 95 from each other.

In the conventional connector connecting structure for a detachable seat, however, in the event that a gap (a looseness) between the positioning pin 96 and hole 97, when the seat 91 is assembled to the link unit 92, the positions of the seat-side connector 94 and the link unit-side connector tend to deviate easily from each other, and there has existed a fear that as this occurs, both the connectors 94, 95 are caused to rub on each other to thereby disrupt a smooth connection thereof or are inserted obliquely in a prying fashion to thereby inflict damage on to each other by the gravity of the seat 91.

In addition, the conventional connector connecting structure for a detachable seat is such as to be designed for a special application to the bitter end and is different from, for example, a connector connecting structure for a general detachable seat which is detached from the floor by a user to increase the space inside the passenger compartment of his or her vehicle. In this case, since the connector remains projecting from the floor after the seat is detached, there is caused a fear that the occupant of the vehicle steps on or is caught by the connector to damage it. Alternatively, in the event that the connector is disposed within the floor in fear of the damage, since dust or drops of water when it rains tend to adhere to the connector when the seat is attached for use (when the connector is connected to its mating one on the seat), there has existed a fear that feeding to the seat fails or the seat malfunctions.

SUMMARY OF THE INVENTION

The invention was made in view of the situations, and an object thereof is to provide a connector connecting structure for a detachable seat which enables an efficient, smooth and secure connection between the seat-side connector and the floor-side connector and which can dismiss the fear that the connector fails due to drops of water or dust on the floor when the seat is in use (when the connector is in connection with its mating one on the seat) or that the occupant is caught by the floor-side connector to thereby damage the connector after the seat has been detached (the connectors have been disengaged from each other).

With a view to attaining the object, according to a first aspect of the invention, there is provided a connector connecting structure for a detachable seat including a floor-side hook provided rotatably on a floor, an arm coupled and fixed to the floor-side hook, and a floor-side hook provided on the arm, wherein a seat-side hook causes the floor-side hook in a collapsed state to rotate in a direction in which the floor-side hook erects together with the arm, so that a seat-side connector and the floor-side connector are connected to each other, when a seat is attached.

According to the configuration above, the floor-side connector falls together with the arm and the hook such that the seat is detached and is situated on or within the floor, and when the seat is attached to the floor, the seat-side hook pushes on the floor-side hook to cause the floor-side hook to rotate and erect, and at the same time that this occurs, the floor-side connector erects together with the arm so as to be positioned higher than the floor, and the seat-side connector and the floor-side connector are brought into connection with each other in this state. The connection of both the connectors may be effected by making use of the rotational force of the arm when the floor-side hook is pushed, or by rotating the seat such that the floor-side connector erects, as will be described later on. The floor-side connector is connected in a direction which intersects the assembling direction of the seat at right angles (the connectors are connected together in a longitudinal or transverse direction, whereas the seat is assembled in a vertical direction).

According to a second aspect of the invention, there is provided a connector connecting structure for a detachable seat according to the first aspect of the invention, wherein the seat is caused to rotate such that the arm erects so as to bring the seat-side connector into connection with the floor-side connector.

According to the configuration above, a seat-side front facing connector is brought into connection with a floor-side rear facing connector while the floor-side connector is caused to erect together with the arm while a hook at the rear of the seat is being brought into engagement with a hook at the rear of the floor such that the seat is inclined to the rear, for example, and the seat is caused to rotate to the front in that state so as to be assembled to the floor horizontally. Alternatively, a seat-side rear facing connector is brought into connection with a floor-side front facing connector while the floor-side connector is caused to erect together with the arm while a hook at the front of the seat is being brought into engagement with a hook at the front of the floor such that the seat is inclined to the rear, for example, and the seat is caused to rotate to the rear in that state so as to be assembled to the floor horizontally.

According to a third aspect of the invention, there is provided a connector connecting structure for a detachable seat according to the first or second aspect of the invention, wherein the floor-side hook is provided with a semi-ring portion and a straight portion and is supported on the floor at an intermediate portion thereof by a shaft portion, and the arm is coupled and fixed to the floor-side hook via the shaft portion.

According to the configuration above, the substantially J-shaped hook on the floor side is supported smoothly rotatably on the floor side at the intermediate shaft portion. The straight portion of the hook is pushed on by the seat-side hook, whereby the hook rotates about the shaft portion as a fulcrum and the semi-ring portion enters to be brought into engagement with the seat-side hook, so that both the connectors are fixed to each other. The shape of the seat-side hook is properly set to an annular, U-shaped, J-shaped or L-shaped configuration as required. The floor-side hook and the arm are fixed via the shaft portion, and the floor-side hook and the arm rotate together about the shaft portion.

According to a fourth aspect of the invention, there is provided a connector connecting structure for a detachable seat according to the third aspect of the invention, wherein when the seat-side hook is brought into engagement with an inside of the semi-ring portion such that the floor-side hook erects, a lower end portion of the seat-side hook is brought into abutment with the straight portion at a position lying further downward than the shaft portion.

According to the configuration above, the lower end portion of the seat-side hook prevents the rotation of the floor-side hook in the erecting state in a returning (falling) direction such that the seat is attached, so as to maintain the engagement (locking) of both the hooks, as well as the rotation of the floor-side connector in a returning (falling) direction, so as to maintain the connection of both the connectors.

According to a fifth aspect of the invention, there is provided a connector connecting structure for a detachable seat according to the third or fourth aspect of the invention, wherein a guiding projecting portion for the seat-side hook is provided on an inside of a distal end of the straight portion.

The seat-side hook is brought into press contact with the straight portion of the floor-side hook in the collapsed state so as to cause the straight portion to rotate downward, and furthermore, the seat-side hook causes the straight portion to rotate further along the projecting portion at the distal end of the straight portion, whereby the floor-side hook is caused to rotate smoothly and securely.

According to a sixth aspect of the invention, there is provided a connector connecting structure for a detachable seat according to any of the first to fifth aspects of the invention, wherein the floor-side connector and the arm fall by gravity so as to be accommodated within the floor.

According to the configuration above, when the seat is detached from the floor, the floor-side connector is caused to fall by gravity so as to be automatically accommodated into the floor together with the arm for protection therein. The arm is designed to fall automatically by setting the center of gravity of the floor-side connector in a direction in which the connector is disconnected relative to the arm.

According to the first aspect of the invention, by causing the floor-side connector to rotate by the pushing force resulting during the attaching work of the seat so as to be brought into connection with the seat-side connector or to move to the position where the floor-side connector can be connected to the seat-side connector, an excessive force is prevented from being applied to the connector in the connecting direction, and both the connectors are connected to each other smoothly and securely. In addition, since the floor-side connector erects together with the arm and is brought into connection with the seat-side connector at the position lying higher than the floor, dust and/or drops of water lying on the floor are prevented from adhering to the connector, whereby the reliability in electrical connection of the connector is increased. Furthermore, since the floor-side connector lies collapsed together with the arm when the seat is not attached, the interference thereof with the occupant is prevented, whereby the floor-side connector is held undamaged safely.

According to the second aspect of the invention, both the connectors can be connected to each other smoothly without difficulty and securely while manually rotating the seat such that the floor-side connector is caused to erect.

According to the third aspect of the invention, the floor-side hook and the arm are caused to rotate coaxially, so that the engagement with the seat-side hook and connection with the seat-side connector or rotation to the connecting position therewith can be implemented smoothly and securely, whereby the connection of the connectors can be implemented smoothly and securely.

According to the fourth aspect of the invention, the engagement between the hooks and connection between the connectors are maintained such that the seat is attached, thereby making it possible to increase the reliability in fixing the seat to the floor and connecting the connectors together.

According to the fifth aspect of the invention, since the seat-side hook can cause the floor-side hook to rotate largely along the projecting portion of the floor-side hook, the engagement of both the connectors and rotating operation of the floor-side connector can be implemented smoothly and securely, thereby making it possible to increase the reliability in connecting the connectors together.

According to the sixth aspect of the invention, since the floor-side connector is accommodated within the floor at the same time that the seat is detached, accommodating work of the floor-side connector is made unnecessary, and once the floor-side connector has been so accommodated, the interference thereof with the occupant is prevented, whereby the damage, deformation or the like of the floor-side connector and the arm is prevented, thereby making it possible to increase in reliability in electrical connection of the connector.

DETAILED DESCRIPTION OF THE PREFERRED EMBODIMENTS

Figure 1:
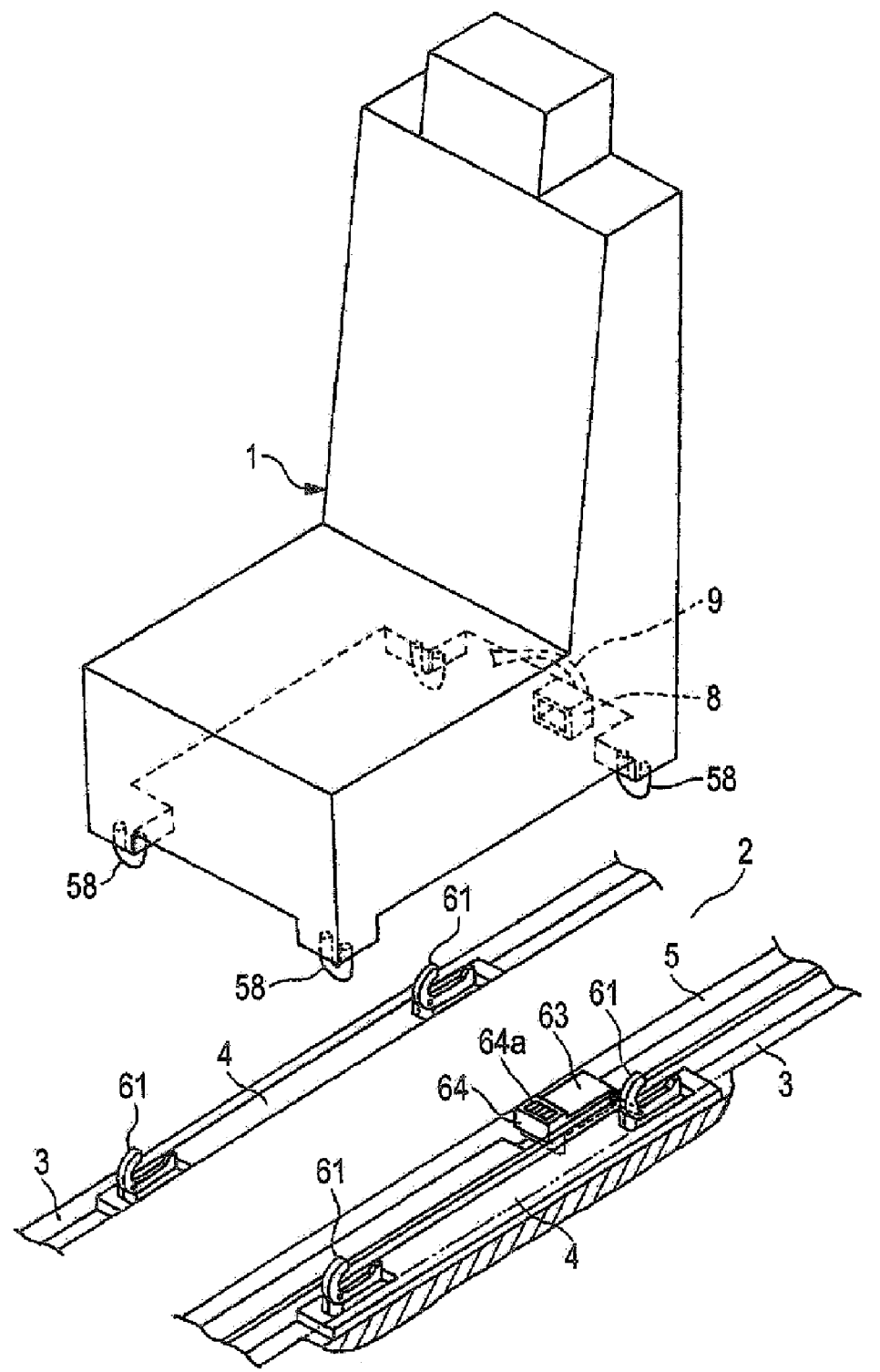
FIG. 1 is an exploded perspective view showing an embodiment of a connector connecting structure for a detachable seat according to the invention.
Figure 2:
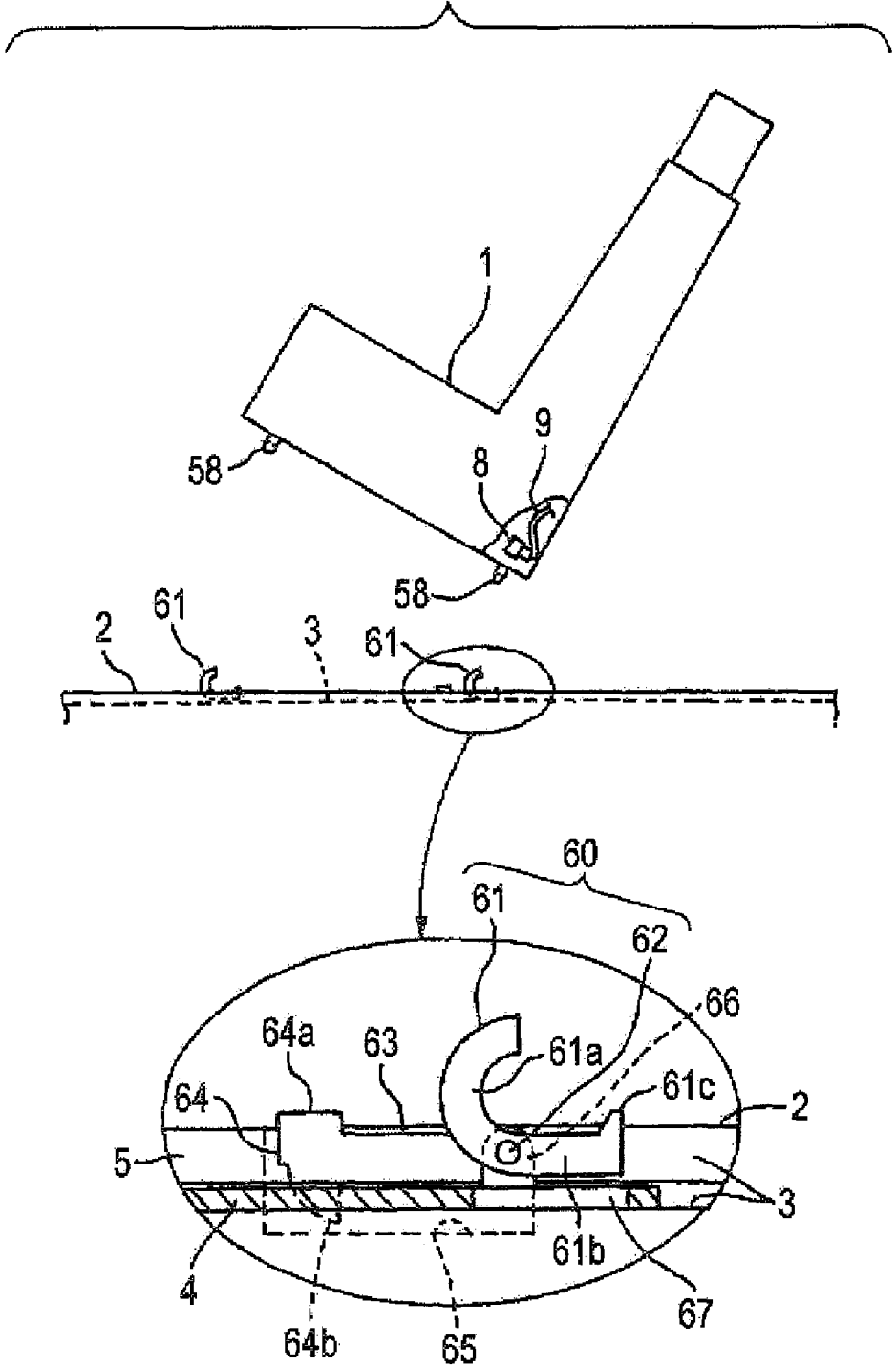
FIG. 2 is a side view showing a state in which a seat is being attached to a floor (inside a circle is an enlarged view of a main part of the structure).
Figure 3:
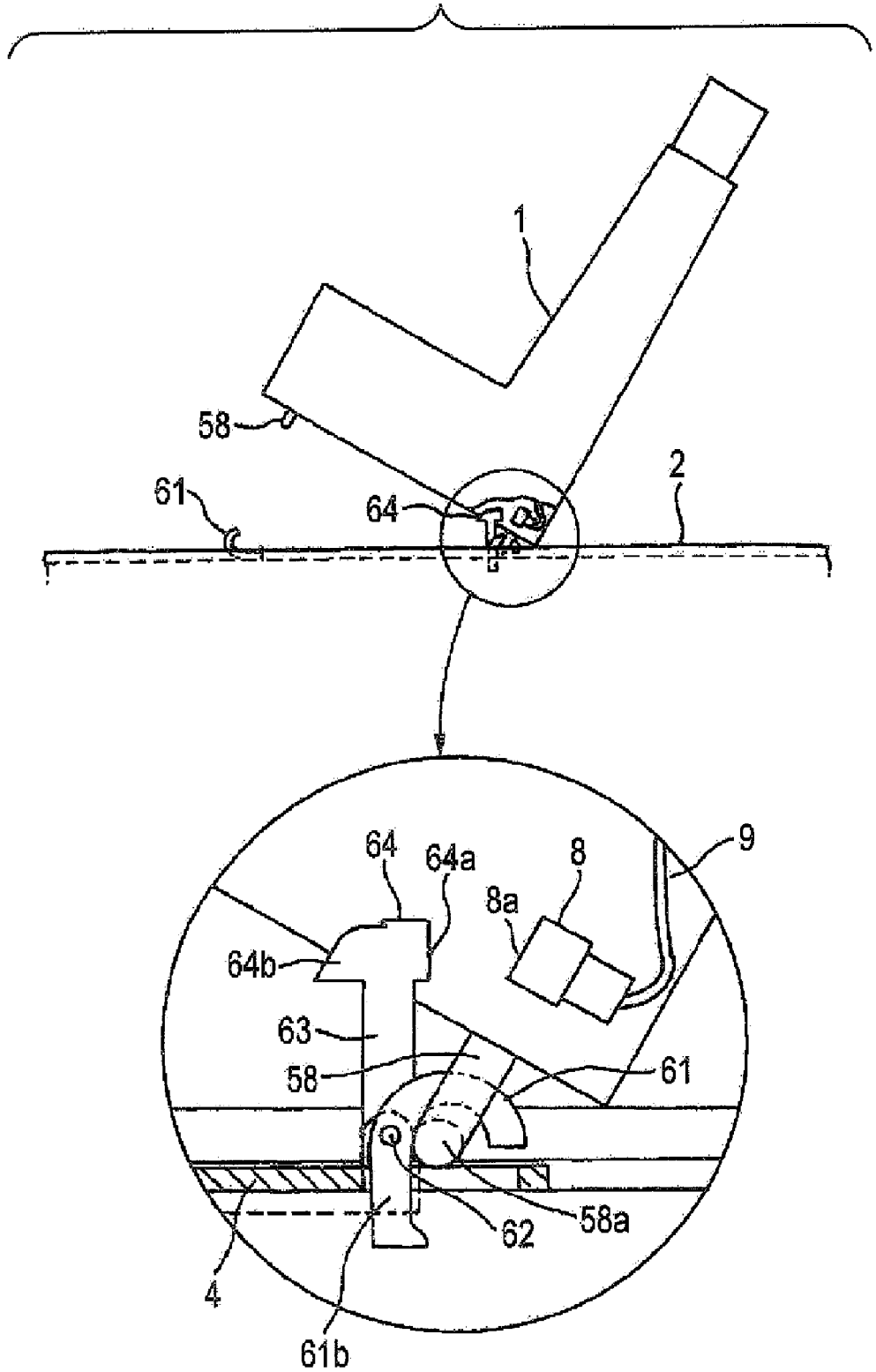
FIG. 3 is a similar side view showing a state in which a rear hook on the seat is brought into engagement with a rear hook on the floor (inside a circle is an enlarged view of the main part of the structure).
Figure 4:
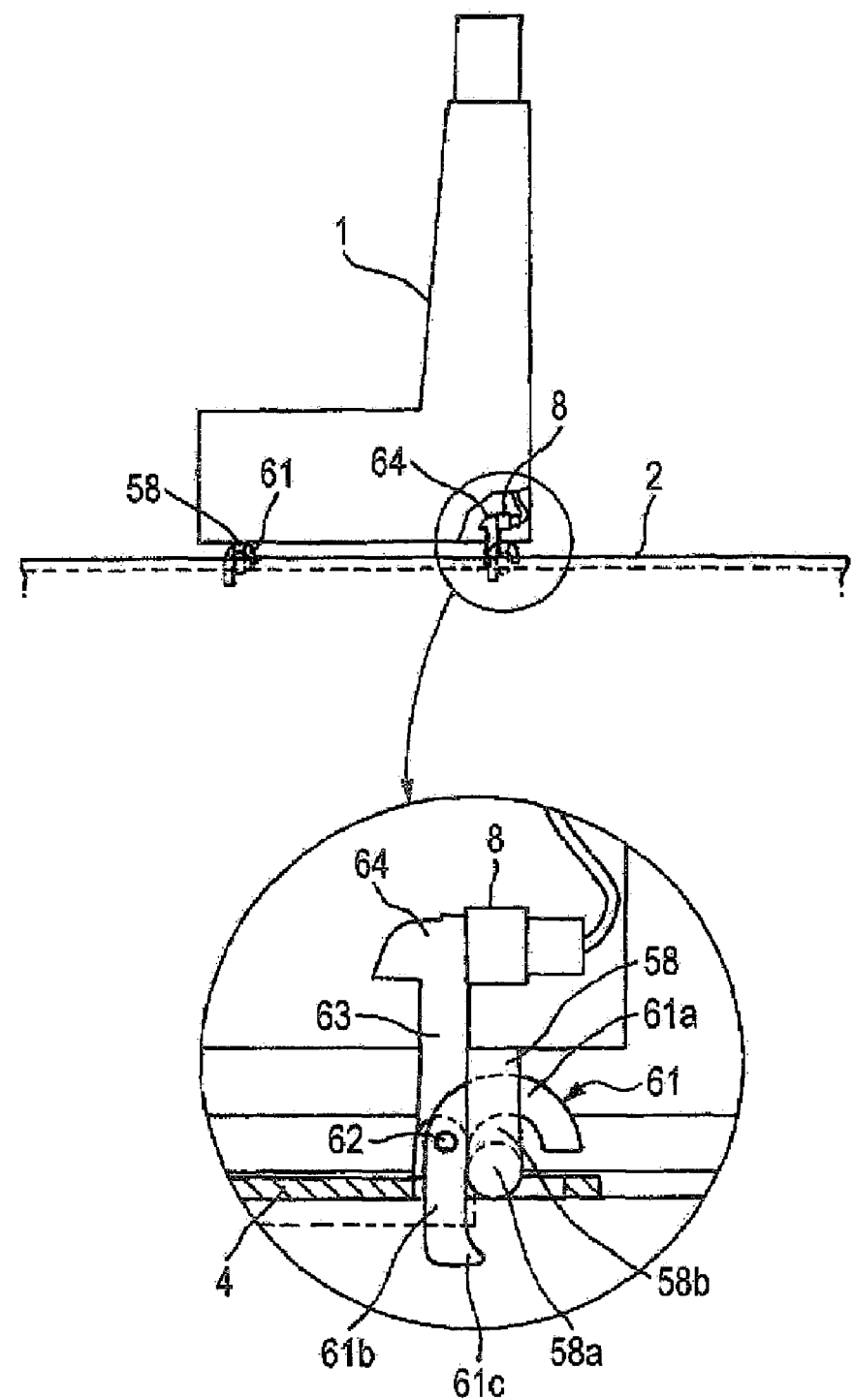
FIG. 4 is a side view showing a state in which the seat has been attached to the floor (inside a circle is an enlarged view of the main part of the structure).
Figure 5:
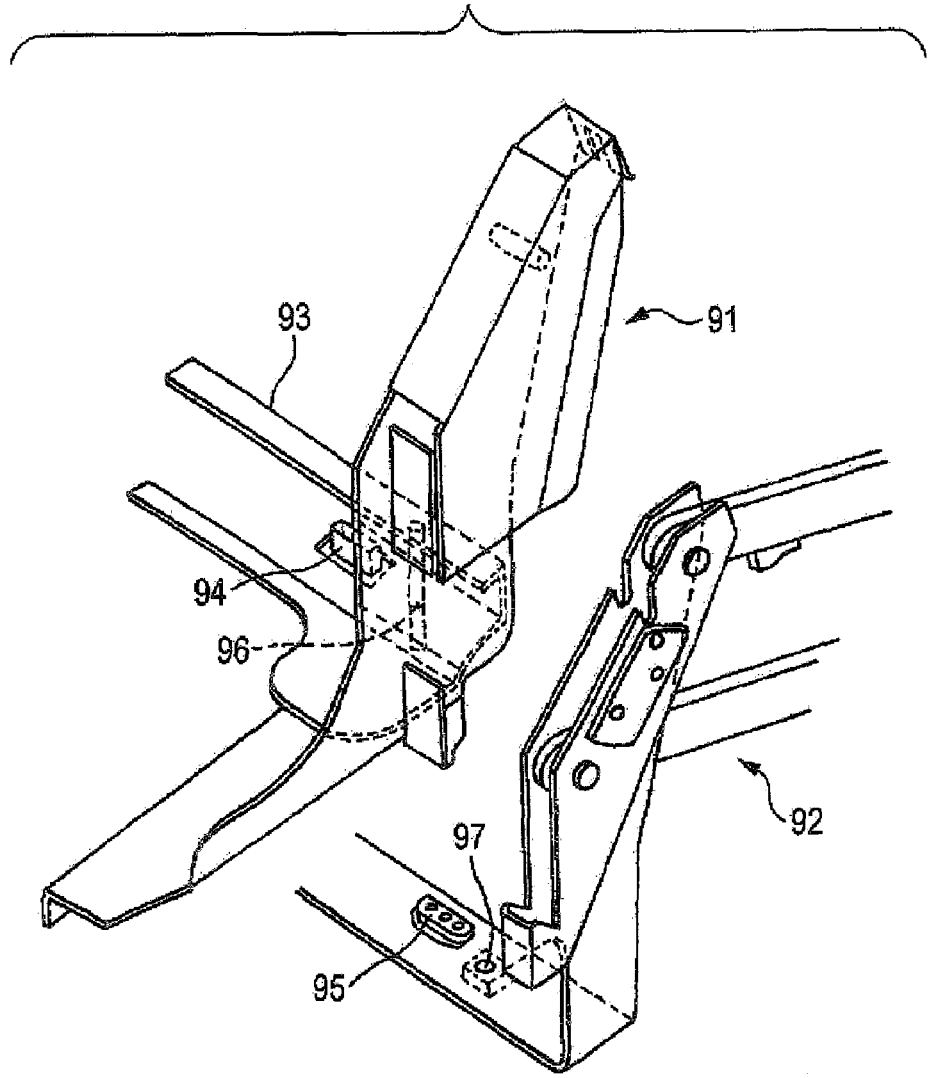
FIG. 5 is an exploded perspective view showing a form of a conventional connector connecting structure for a detachable seat.

FIGS. 1 to 4 show an embodiment of a connector connecting structure for a detachable seat according to the invention. FIGS. 2 to 4 are also effective in showing a connectors connecting method for a detachable seat.

As is shown in FIG. 1, a detachable seat 1 is a sliding seat of a motor vehicle and is fixed by bringing metallic hooks provided in four corners of a bottom portion thereof into engagement with rotary metallic hooks (buckles) on a floor 2 of a vehicle body. A pair of left and right grooved guide rails 3 are provided on the floor 2 for guiding the sliding of the seat 1, and a sliding fixable member 4 having a pair of front and rear rotary hooks 61 is brought into slidable engagement with each guide rail 3.

The sliding fixable member 4 is such that a pair of substantially J-shaped hooks 61 are rotatably supported at the front and rear of a sliding plate (denoted also by reference numeral 4) and can be fixed to a desired position on the guide rail 3 by operating a sliding lock lever (not shown) on the seat 1. In this embodiment, for example, a pair of left and right erecting pieces (bearings) 66 (FIG. 2) are provided on the sliding plate 4, the hook 61 is rotatably supported by a metallic shaft portion 62 between the pair of erecting pieces 66, and an escape slit 67 is provided at a transverse center of the sliding plate 4 in order for the hook 61 to be rotated downward. The shapes of erecting piece 66 and the slit 67 are set properly as required.

For example, one of the erecting pieces 66 is disposed close to the outside of the floor-side hook 61, while the other erecting piece 61 is disposed close to the outside of an arm 63, which will be described later on, and a shaft portion 62 which is passed through the hook 61 and the arm 63 to be fixed in place therein.

On one of the guide rails 3, a floor-side connector 64 is provided adjacent to the rear hook 61 of the sliding fixable member 4 so as to rotate together with the hook 61. A recessed groove 5 is provided between the pair of guide rails 3 on the floor 2 in adjacent (close) to and in parallel with the one of the guide rails 3 for allowing the arm 63 of the floor-side connector 64 to move in a direction in which the seat is caused to slide, and a deeper recess portion 65 is provided so as to communicate with the recessed groove 5 for accommodating therein the connector 64 when it falls to lie horizontally (In FIG. 2, while the guide rail 3 and the recessed groove 5 are illustrated integrally, as a matter of convenience, it is possible to adopt such a configuration).

The connector accommodating recess portion 65 is preferably provided at a rearmost sliding position or frontmost sliding position of the seat 1, for example. The recessed groove 5 can be formed deeper so as to double as the connector accommodating recess portion 65. A width of an upper opening (denoted also by reference numeral 3 in FIG. 1) of each of the guide rails 3 is sized so as to allow the seat-side hook 58 to enter the opening. A recessed groove or space is provided in a lower side of the one of the guide rails 3 as shown in FIG. 3 so that a lower end portion 61b of the erecting hook 61 is accommodated and is allowed to move therein in the direction in which the seat is caused to slide.

As is shown in FIG. 2, when the seat 1 is not attached, the floor-side hook 61 falls horizontally into the floor 2 to be accommodated therein so as to rotate about the shaft portion 62. The straight arm 63 is coupled and fixed to the shaft portion 62, and the floor-side connector 64 is provided at a distal end of the arm 63. The hook 61 and the shaft portion 62 make up a driving unit 60 for the arm 63. The arm 63 can be fixed not to the shaft portion 62 but to a side of a straight portion 61b of the hook 61.

The hook 61 is provided with a arc-shaped semi-ring portion 61a at a distal end thereof, the straight portion 61b at a proximal end thereof and a projecting portion 61c provided at a distal end of the straight portion 61b so as to face inward. The shaft portion 62 is preferably so short that the arm 63 is disposed close to or in contact with the hook 61. It is also possible to dispose the connector 64 in a position which lies away from the hook 61 by extending the shaft portion 62.

As is shown in FIGS. 1, 2, the floor-side connector 64 of the invention is provided integrally with the arm 63, and a rectangular connector housing (denoted also by reference numeral 64) made of a synthetic resin is formed integrally with the arm 63 which is formed of a synthetic resin into a rectangular post shape. A rear portion 64b of the connector housing projects more than the arm 63 toward an opposite end to a fitting front end face 64a thereof, so as to allow the arm 63 to fall by the gravity of the connector 64. A plurality of electrically wired terminals (not shown) are accommodated within the connector housing, and individual electric wires (not shown) are led out of the connector housing so as to make up part of a floor wiring harness, the connector 64 being provided with the connector housing and the electrically wired terminals.

The shaft portion 62 is coupled to a proximal end portion (an opposite end portion to the connector 64) of the arm 63, and the shaft portion 62 is coupled to an intersecting portion between the semi-ring portion 61a and the straight portion 61b of the hook 61 or in the vicinity of the intersecting portion. The shaft portion 62 is fixed to the hook 61 and the arm 63.

The fitting front end face 64a of the connector 64 is situated to be oriented upward such that the arm 63 and the connector 64 fall flat together with the hook 61. For example, the floor-side connector 64 preferably accommodates therein an electrically wired female terminal (not shown) and has a small terminal inserting hole (not shown) provided in the fitting front end face 64a so as to face a male terminal (not shown) of a seat-side connector 8 from the viewpoint of preventing the intrusion of dust or the like into the connector. The terminal inserting hole or an opening in a connector fitting compartment (when the male terminal is accommodated) can be made to be closed by a shutter.

While in the example shown in FIG. 2, the fitting front end face 64a of the floor-side connector 64 is made to project slightly upward from the surface of the floor (denoted also by reference numeral 2) so as to make it difficult for dust to enter the inside of the connector 64, the fitting front end face 64a can be accommodated completely within the floor. The floor-side hook 61 can also be accommodated completely within the floor.

In addition, the arm 63 is formed of a metal separately from the connector 64, and the connector 64 can be screwed to the arm 63 or fixed thereto by means of insert molding. The shapes of the arm 63 and the connector 64 are set properly as required.

The pair of substantially inverted U-shaped hooks 58 are disposed at the front and rear of the bottom portion of the seat in a direction in which the hooks 58 intersect the hooks 61 on the floor side at right angles. The seat-side connector 8 is disposed in a position lying closer to one side of the seat 1 and in the vicinity of the rear hook 58 at a rear end of the seat 1 which lies close to the bottom portion thereof so as to face to the front (a fitting front end face 8a thereof (FIG. 3) faces to the front). The seat-side connector 8 continues to a wiring harness portion 9 within the seat. In the event that the floor-side connector 64 accommodates therein a female terminal (not shown), the seat-side connector 8 has a male terminal (not shown) accommodated within a connector housing, and the connector housing has a connector fitting compartment (not shown) into which a tab-shaped or pin-shaped electric contact portion of the male terminal is made to project.

In the state shown in FIG. 2 where the seat 1 is detached, the floor-side hook 61 and the arm 63 fall flat about the shaft portion 62 as a fulcrum by gravity so as to be situated horizontal, and the floor-side connector 64 is substantially accommodated within the floor 2 with the fitting front end face 64a of the connector 64 being situated to be oriented upward. The floor-side connector 64 is accommodated within the recess portion 65 on the floor 2, whereby the interference thereof with the occupant is prevented, and the fear is dismissed that the floor-side connector 64 would be damaged or deformed due to the interference. The recess portion 65 can be deepened deeper than shown in FIG. 2 so as to accommodate the floor-side connector completely within the floor 2.

As is shown in FIGS. 2 to 3, the left and right hooks 58 at the rear of the seat 1 are simultaneously brought into engagement with the left and right hooks 61 at the rear of the floor 2 with the seat positioned to be inclined to the rear. The floor-side hooks 61 rotate clockwise from the state shown in FIG. 2 so as to fix the seat-side hooks 58 in place in such a manner that the seat-side hooks 58 are not disengaged from the floor-side hooks 61, respectively. The inwardly inclined or curved surface of the projecting portion 61c of the hook 61 acts as a guiding surface relative to the seat-side hook 58.

The arm 63 erects vertically in association with the rotation of one of the hooks 61, whereby the fitting end face 64a of the floor-side connector 64 which lies at the distal end of the arm is made to face to the rear. As is shown in FIG. 3, since a lower end portion (a horizontal portion) 58a of the seat-side hook 58 is brought into contact with the portion (the straight portion) 61b of the erecting floor-side hook 61 which lies further downward than the shaft portion 62 thereof, the returning (falling) of the floor-side hook 61 toward the front is interrupted.

In this state, when the seat is restored forward to its normal position while being caused to rotate downward as is shown in FIG. 4, the seat-side connector 8 is fitted in the floor-side connector 64. As with the rear hooks 61 on the floor 2, the front hooks 61 thereon are pushed by the front hooks 58 on the seat 1 to be caused to rotate clockwise to thereby be brought into engagement with the hooks 58 on the seat 1 so as to fix the hooks 58 in place.

By bringing the lower end portion 58a of the seat-side hook 58 into abutment with the straight portion 61b of the floor-side hook 61 which lies further downward than the shaft portion 62 thereof, the forward rotation of the floor-side hook 61 is prevented, whereby both the hooks 58, 61 are held in an engaged (locked) state. In FIG. 4, while there exists a gap between the lower end portion 58a and the semi-ring portion 61a, a vertical looseness is prevented by bringing left and right curved portions 58b of the hook 58 which continue to the lower end portion 58a thereof into abutment with the semi-ring portion 61a.

As a locking unit for preventing the disengagement of the floor-side hook 61 in this state, a horizontal pin (not shown), for example, is inserted so as to be brought into abutment with the projecting portion 61 at the proximal end of the floor-side hook 61 or like, or the hook 61 is fixed to the sliding fixable member 4 on the floor side or the like by a releasable locking unit or the like (not shown), so that the fixing strength of the seat 1 can be enhanced.

Since the floor-side connector 64 is situated higher than the floor surface 2 when the seat 1 is attached (when the connectors 8, 64 are connected together), adhesion of dust and/or drops of water lying on the floor to the connector 64 can be prevented in an ensured fashion.

It is preferable to specify the attaching position of the seat 1, that is, the connecting position of the connectors 8, 64 to the sliding rearmost position or sliding frontmost position of the seat 1 in facilitating the work of bringing the seat-side hooks 58 into engagement with the floor-side hooks 61 and accommodating the floor-side connector 64 in the predetermined recess portion 65 on the floor 2. In a case where the recessed groove 5 (FIG. 1) provided on the floor 2 to allow the arm 63 of the connector 64 to be moved in the seat sliding direction is formed deeper so as to double as the connector accommodating recess portion 65, the seat 1 can be attached and detached at a desired position in a longitudinal direction of the guide rail 3.

When the seat 1 is detached, locking units of the front hooks 61 on the floor side are operated to be released so as to release the engagement thereof with the front hooks 58 on the seat side, and as is shown in FIG. 3, the seat 1 is caused to fall obliquely rearward round the rear hooks 58 as fulcrums, whereby the seat-side connector 8 can easily be disconnected from the floor-side connector 64. In this state, locking units (not shown) of the rear hooks 61 are operated to be released so as to release the engagement thereof with the rear hooks 58 on the seat side, whereby the seat can easily be detached. The fitting of both the connectors 8, 64 is released, and at the same time as this occurs, the floor-side connector 64 falls about the shaft portion 62 as a fulcrum by gravity so as to be accommodated into the recess portion 65 or the recessed groove 5 on the floor 2 for protection.

Note that while in the embodiment, the seat 1 is made to freely slide in the longitudinal direction of the vehicle along the guide rails 3, in the case of a seat which does not have to slide, the guide rails 3, the sliding fixable members 4 and the recessed groove 5 on the floor 2 are omitted, while a recess portion 65 for accommodating the connector 64 and the arm 63 when they fall and recess portions for accommodating the lower end portions of the hooks 61 when they erect are provided on the floor 2.

In this case, as the attaching method of the seat 1 and the fitting engagement and disengagement method of the connectors 8, 64, the connectors may be connected together at the same time that the seat 1 is assembled to the floor vertically as is shown in FIG. 1 (this method will be described in detail later on), or as is shown in FIGS. 2 to 4, the seat 1 may be assembled to the floor in a tilted state, and the seat 1 is caused to rotate horizontally in that state for connection of the connectors. In the case of the seat that cannot slide, the orientation and rotating direction of the floor-side hooks 61 do not necessarily have to be longitudinal but can be transverse (a transverse direction of the vehicle).

In addition, in the case of the sliding seat 1, the sliding fixable member 4 can be divided into front and rear members so as to correspond to the front hook 61 and the rear hook 61 on the floor, respectively. Additionally, the other floor-side hooks 61 than the front hooks 61 and the hook 61 lying in the vicinity of the floor-side connector 64 can be formed into an inverted U-shape as with the seat-side hooks 58 or can be formed into other fixing configurations than the hook one such as a bolting configuration.

Furthermore, the seat 1 can be caused to rotate to the rear while the front hook 61 on the floor 2 is being pushed to be caused to rotate and erect by not the rear hook 58 but the front hook 58 on the seat 1, so that a front connector (8) on the seat 1 can be brought into connection with a connector (64) on the floor side. In this case, the front hook 61 and connector 64 are disposed to be oriented longitudinally reversely with respect to what is shown in FIG. 1, and a fitting front end face 8a of the seat side connector 8 is disposed to face to the rear.

Moreover, in place of pushing the front hooks 61 on the floor 2 by the front or rear hooks 58 on the seat 1 so as to cause the front hooks 61 to rotate and erect by tilting the seat 1 during the attaching work thereof, the seat 1 can be assembled to the floor 2 from above in a horizontally held state as shown in FIG. 1 without being tilted, whereby the floor-side hooks 61 are caused to rotate and erect by the vertical hooks 58 on the seat 1, so that the floor-side connector 64 can be fitted on the horizontal connector 8 on the seat side by virtue of the rotational force of the hook 61. The seat assembling method shown in FIG. 1 in which the seat 1 is lowered direct downward while held horizontal so as to be assembled to the floor 2 is a basic method compared to the attaching method of the seat 1 shown in FIGS. 2 to 4, and the way of fitting both the connectors 8, 64 together in the assembling method shown in FIG. 1 is more efficient than the way used in the attaching method shown in FIGS. 2 to 4 and the connectors connecting work can be facilitated further, since the forward rotation of the seat 1 shown in FIGS. 3 to 4 is made unnecessary.

In this case, in place of connecting the connectors together such that the floor-side connector 64 is kept erecting perpendicularly as is shown in FIG. 3, the floor-side connector 64 can be caused to rotate largely further rearward than the perpendicular position so as to be connected to the seat-side connector 8 which is disposed to be oriented obliquely upward. In addition, on the contrary to this, the floor-side connector 64 can be caused to rotate to a position just before the perpendicular position so as to be connected to the seat-side connector 8 which is disposed to be oriented obliquely downward. Also, in these cases, the disconnection of the connectors 8, 64 can easily be implemented by releasing the fixed front hook 61 so as to allow the seat 1 to be rotated to the rear as is shown in FIG. 3.

What is claimed is:

1. A connector connecting structure for a detachable seat comprising:
    a floor-side hook provided rotatably on a floor;
    an arm coupled and fixed to the floor-side hook; and
    a floor-side connector provided on the arm, wherein
    a seat-side hook causes the floor-side hook in a collapsed state to rotate in a direction in which the floor-side hook erects together with the arm, so that a seat-side connector and the floor-side connector are connected to each other, when the seat is attached.

2. A connector connecting structure for a detachable seat according to claim 1, wherein the seat is caused to rotate such that the arm erects so as to bring the seat-side connector into connection with the floor-side connector.

3. A connector connecting structure for a detachable seat according to claim 1, wherein the floor-side hook is provided with a semi-ring portion and a straight portion and is supported on the floor at an intermediate portion thereof by a shaft portion, and the arm is coupled and fixed to the floor-side hook via the shaft portion.

4. A connector connecting structure for a detachable seat according to claim 3, wherein when the seat-side hook is brought into engagement with an inside of the semi-ring portion such that the floor-side hook erects, a lower end portion of the seat-side hook is brought into abutment with the straight portion at a position lying further downward than the shaft portion.

5. A connector connecting structure for a detachable seat according to claim 3, wherein a guiding projecting portion for the seat-side hook is provided on an inside of a distal end of the straight portion of the floor-side hook.

6. A connector connecting structure for a detachable seat according to claim 1, wherein the floor-side connector and the arm fall by gravity so as to be accommodated within the floor.

* * * * *